US012801172B2

(12) United States Patent
Gupta et al.

(10) Patent No.: US 12,801,172 B2
(45) Date of Patent: Nov. 17, 2026

(54) VOLTAGE REGULATOR WITH TRANSIENT RESPONSE FEEDBACK CIRCUIT

(71) Applicant: Texas Instruments Incorporated, Dallas, TX (US)

(72) Inventors: Harshil Gupta, Jabalpur (IN); Arnab Das, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 259 days.

(21) Appl. No.: 18/643,221

(22) Filed: Apr. 23, 2024

(65) Prior Publication Data

US 2025/0328157 A1 Oct. 23, 2025

(51) Int. Cl.
*G05F 1/595* (2006.01)
*G05F 1/575* (2006.01)

(52) U.S. Cl.
CPC .............. *G05F 1/575* (2013.01); *G05F 1/595* (2013.01)

(58) Field of Classification Search
CPC .......................................................... G05F 1/56
See application file for complete search history.

(56) References Cited

U.S. PATENT DOCUMENTS 8,222,877 B2 * 7/2012 Cerchi .................... G05F 1/565 323/282
10,310,530 B1 * 6/2019 Lu .......................... G05F 1/468

FOREIGN PATENT DOCUMENTS

EP 1947544 A1 * 7/2008 ............. G05F 1/565
WO WO-9641248 A1 * 12/1996 ............. G05F 1/565

* cited by examiner

*Primary Examiner* — Adolf D Berhane
(74) *Attorney, Agent, or Firm* — Michael T. Gabrik; Charles F. Koch

(57) ABSTRACT

In described examples, an integrated circuit (IC) includes an error amplifier, first and second resistors, first and second transistors, and a current source. A control terminal of the first transistor is coupled to an output of the error amplifier. A first terminal of the second transistor is coupled to a first terminal of the first transistor and a first terminal of the first resistor. A control terminal of the second transistor is coupled to a second terminal of the first resistor, a second terminal of the second resistor, and a first input of the error amplifier. A first terminal of the current source is coupled to a second terminal of the second transistor.

20 Claims, 4 Drawing Sheets

VOLTAGE REGULATOR WITH TRANSIENT RESPONSE FEEDBACK CIRCUIT

TECHNICAL FIELD

This application relates generally to voltage regulators, and more particularly to improving load transient response in low-dropout voltage regulators.

BACKGROUND

In a voltage regulator, the dropout voltage is the difference between the supply voltage (or input voltage) and the output voltage. In a low-dropout (LDO) voltage regulator, this difference can be relatively small. For example, an LDO voltage regulator with a 1.7 volt (V) supply voltage might have a 1.5 V output voltage. LDO voltage regulators are a type of DC linear voltage regulator. In some examples, LDO voltage regulators can be used to maintain an approximately constant, low-noise voltage output in response to an unregulated, potentially highly variable supply voltage, such as from a battery, and in response to a variable load.

SUMMARY

In described examples, an integrated circuit (IC) includes an error amplifier, first and second resistors, first and second transistors, and a current source. A control terminal of the first transistor is coupled to an output of the error amplifier. A first terminal of the second transistor is coupled to a first terminal of the first transistor and a first terminal of the first resistor. A control terminal of the second transistor is coupled to a second terminal of the first resistor, a second terminal of the second resistor, and a first input of the error amplifier. A first terminal of the current source is coupled to a second terminal of the second transistor.

DETAILED DESCRIPTION

Figure 1A:
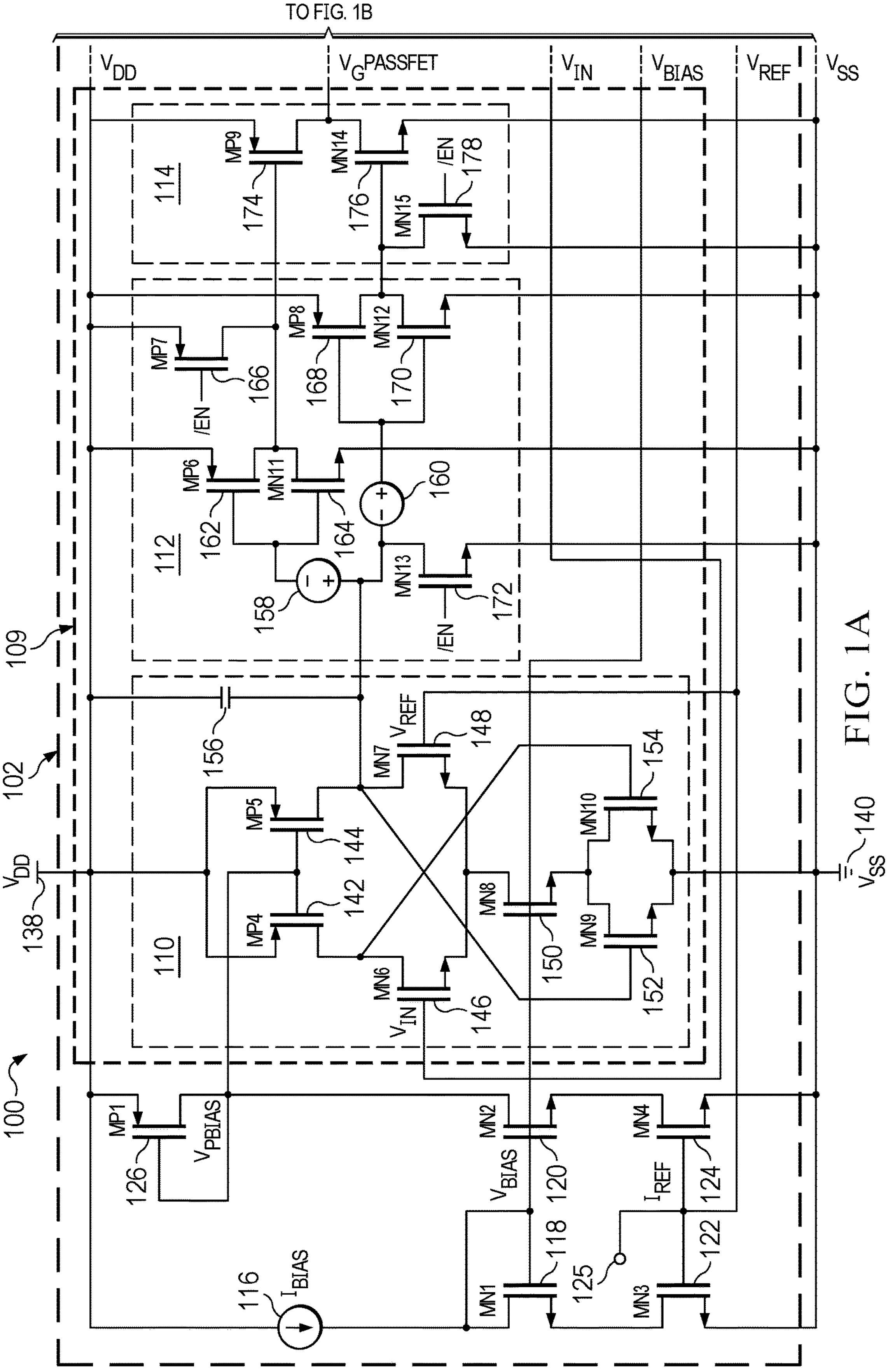
FIG. 1A shows a first part of a circuit diagram of an example voltage regulated system including an LDO voltage regulator with a load transient response feedback circuit.

Generally, an LDO voltage regulator provides a regulated or target output voltage $V_{OUT}$, controlled in part by feedback of $V_{OUT}$ to various components within the circuit. In some architectures, after a rapid increase or decrease in current demand of a load (a load transient), a voltage regulator can experience a lag time between a deviation of $V_{OUT}$ from the target voltage resulting from the load transient, and a corrective change in regulator behavior to return $V_{OUT}$ to the target level. For example, load demand can change sufficiently, or over a sufficiently short time period, such that the feedback control is too slow to sufficiently regulate $V_{OUT}$. In other words, a response time of a feedback loop controlling voltage regulation by the LDO voltage regulator may be too long (slow) to prevent $V_{OUT}$ from leaving from the target level or target range. A feedback circuit responsive to $V_{OUT}$ and controlling a level of a compensation current provided to an output node can be used to improve the load transient response time of the LDO voltage regulator.

Metal-oxide-semiconductor field-effect transistors (MOSFETS) are numbered as M[channel type][number], where the number increases for each differing transistor of a same channel type. Channel types include n-channel MOSFETS (NMOS) and p-channel MOSFETS (PMOS). The channel type for each transistor is only an example, and other examples may substitute another transistor of a different type for any illustrated transistor. Also, the same reference numbers or other reference designators are used in the drawings to designate features that are related structurally and/or functionally.

Figure 1B:
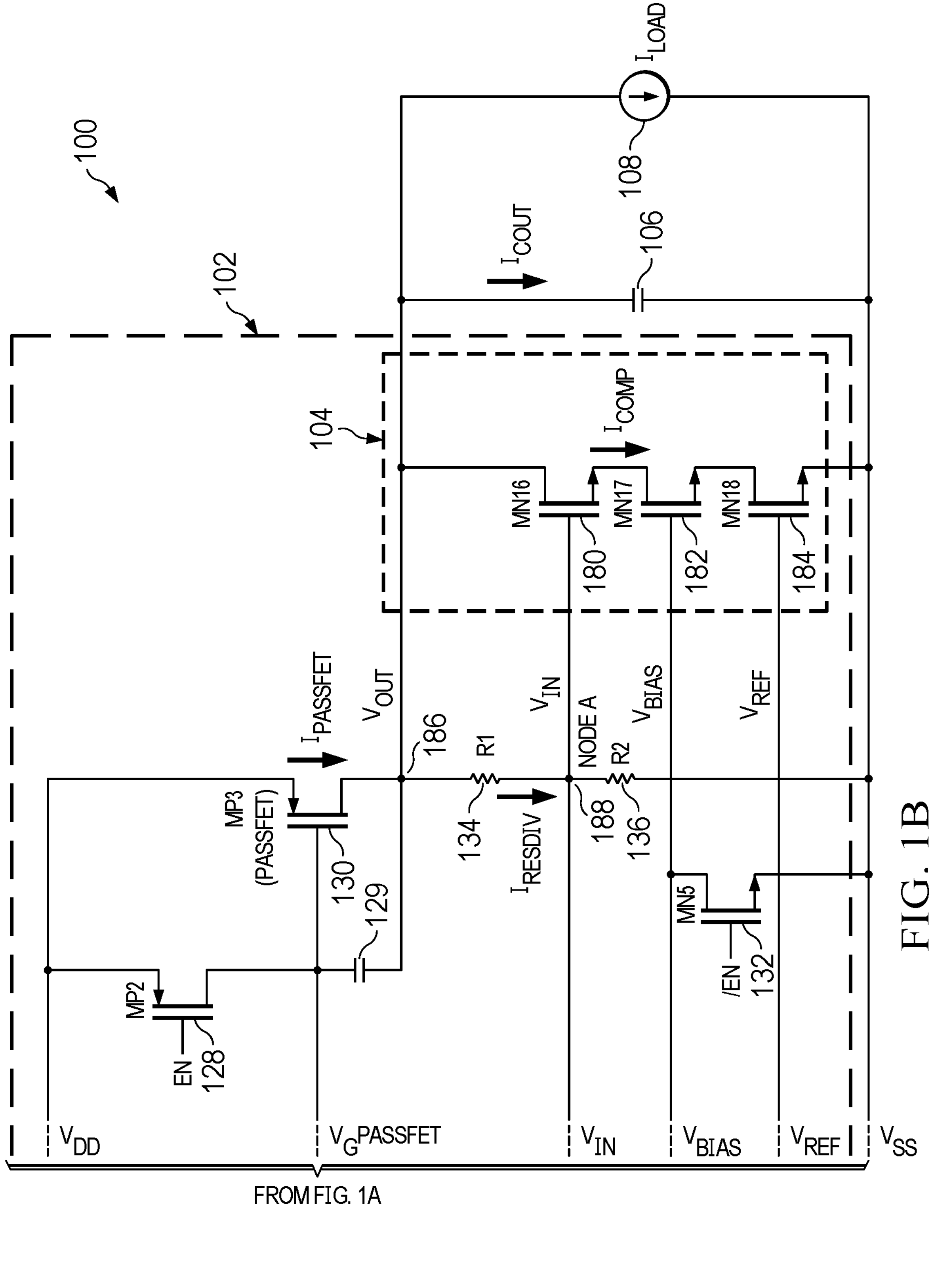
FIG. 1B, continuing from FIG. 1A, shows a second part of the circuit diagram of the example voltage regulated system including the LDO voltage regulator with the load transient response feedback circuit.

FIGS. 1A and 1B show a circuit diagram of a first example voltage regulated system 100 including an LDO voltage regulator 102 with a load transient response feedback circuit 104 (referred to herein as the feedback circuit 104). The LDO voltage regulator 102 has two feedback loops: the feedback circuit 104, and a negative feedback loop that includes a differential amplifier (ring amplifier 109) and a passFET 130 and is responsive to voltage signals $V_{REF}$ (a control signal) and $V_{IN}$ (a feedback signal). The voltage regulated system 100 also includes a load capacitor 106 and a first current source 108. The first current source 108 corresponds to a load current demand, and can be described as providing a current $I_{LOAD}$. In some examples, the LDO voltage regulator 102 is fabricated on an integrated circuit (IC). In some examples, other portions of the voltage regulated system 100 are fabricated on an IC.

The LDO voltage regulator 102 includes a ring amplifier 109 that has a first stage 110, a second stage 112, and a third stage 114. The LDO voltage regulator 102 also includes a second current source 116 configured to provide a current IBIAS, a first n-channel MOSFET (MN1) 118, a second n-channel MOSFET (MN2) 120, a third n-channel MOSFET (MN3) 122, a fourth n-channel MOSFET (MN4) 124, a first p-channel MOSFET (MP1) 126, a second p-channel MOSFET (MP2) 128, a second capacitor 129, a third p-channel MOSFET (MP3, referred to as the passFET) 130, a fifth n-channel MOSFET (MN5) 132, a first resistor (R1) 134 with resistance R1, a second resistor (R2) 136 with resistance R2, a first voltage source 138 providing a voltage $V_{DD}$, and a ground 140 providing a ground voltage $V_{SS}$. In some examples, the first voltage source 138 is an analog high voltage rail, and the ground 140 is an analog low voltage rail.

FIG. 1B includes the feedback circuit 104, the load capacitor 106, the first current source 108, MP2 128, the second capacitor 129, the passFET 130, MN5 132, and the first and second resistors 134 and 136. A $V_{OUT}$ node 186 and a node A 188 (described below) are also shown in FIG. 1B. Other components of the voltage regulated system 100 are shown in FIG. 1A. A correspondence between conductive lines connecting FIG. 1A to FIG. 1B is indicated using signals carried by those lines. VG PASSFET is a signal provided to the gate of the passFET 130. The other signals shared between FIGS. 1A and 1B are $V_{DD}$, $V_{IN}$, $V_{BIAS}$, $V_{REF}$, and $V_{SS}$, which are described below.

The first stage 110 of the ring amplifier 109 includes a fourth p-channel MOSFET (MP4) 142, a fifth p-channel MOSFET (MP5) 144, a sixth n-channel MOSFET (MN6) 146, a seventh n-channel MOSFET (MN7) 148, an eighth n-channel MOSFET (MN8) 150, a ninth n-channel MOSFET (MN9) 152, a tenth n-channel MOSFET (MN10) 154, and a third capacitor 156.

The second stage 112 of the ring amplifier 109 includes a second voltage source 158 providing a first offset voltage, a third voltage source 160 providing a second offset voltage, a sixth p-channel MOSFET (MP6) 162, an eleventh n-channel MOSFET (MN11) 164, a seventh p-channel MOSFET (MP7) 166, an eighth p-channel MOSFET (MP8) 168, a twelfth n-channel MOSFET (MN12) 170, and a thirteenth n-channel MOSFET (MN13) 172.

The third stage 114 of the ring amplifier 109 includes a ninth p-channel MOSFET (MP9) 174, a fourteenth n-channel MOSFET (MN14) 176, and a fifteenth n-channel MOSFET (MN15) 178.

The feedback circuit 104 includes a sixteenth n-channel MOSFET (MN16) 180, a seventeenth n-channel MOSFET (MN17) 182, and an eighteenth n-channel MOSFET 184.

A first terminal of the second current source 116 is connected to the first voltage source 138. A second terminal of the second current source 116 is connected to a gate and a drain of MN1 118, a gate of MN2 120, a gate of MN8 150, a drain of MN5 132, and a gate of MN17 182. A source of MN1 118 is connected to a drain of MN3 122. A source of MN3 122 is connected to ground 140. A source of MN5 132 is connected to ground 140, and a gate of MN5 132 is configured to receive an inverted ENABLE signal (/EN).

A source of MP1 126 is connected to the first voltage source 138. A gate and a drain of MP1 126 are connected to gates of MP4 142 and MP5 144 and a drain of MN2 120, and such connections have a voltage $V_{PBIAS}$. A source of MN2 120 is connected to a drain of MN4 124, and a source of MN4 124 is connected to ground 140. A gate of MN3 122 is connected to a gate of MN4 124, a reference terminal 125 configured to receive a reference voltage $V_{REF}$, a gate of MN7 148, and a gate of MN18 184.

A source of MP4 142 is connected to a source of MP5 144 and to the first voltage source 138. A drain of MP4 142 is connected to a drain of MN6 146 and a gate of MN10 154. A drain of MP5 144 is connected to a drain of MN7 148, a gate of MN9 152, a first terminal (such as a capacitive plate) of the third capacitor 156, a positive terminal of the second voltage source 158, a negative terminal of the third voltage source 160, and a drain of MN13 172. A second terminal of the third capacitor 156 is connected to the first voltage source 138. A source of MN13 172 is connected to ground 140. A gate of MN13 172 receives the inverted ENABLE signal.

A gate of MN6 146 is connected to a first terminal of R1 134, a first terminal of R2 136, and a gate of MN16 180. A source of MN6 146 is connected to a source of MN7 148 and a drain of MN8 150. A source of MN8 150 is connected to drains of MN9 152 and MN10 154. A source of MN9 152 is connected to a source of MN10 154 and to ground 140.

A negative terminal of the second voltage source 158 is connected to gates of MP6 162 and MN11 164. A source of MP6 162 is connected to the first voltage source 138. A drain of MP6 162 is connected to a drain of MN11 164, a drain of MP7 166, and a gate of MP9 174. A source of MP7 166 is connected to the first voltage source 138, and a gate of MP7 166 receives the ENABLE signal (EN). A source of MP9 174 is connected to the first voltage source 138. A source of MN11 164 is connected to ground 140.

A positive terminal of the third voltage source 160 is connected to gates of MP8 168 and MN12 170. A source of MP8 168 is connected to the first voltage source 138. A drain of MP8 168 is connected to a drain of MN12 170, the gate of MN14 176, and a drain of MN15 178. Sources of MN12 170, MN14 176, and MN15 178 are connected to ground 140. A gate of MN15 178 is configured to receive the inverted ENABLE signal.

A drain of MP9 174 is connected to drains of MN14 176 and MP2 128, a gate of the passFET 130, and a first terminal of the second capacitor 129. A source of MP2 128 is connected to the first voltage source 138, and a gate of MP2 128 is configured to receive the ENABLE signal. A source of MP3 130 is connected to the first voltage source 138.

A second terminal of the second capacitor 129 is connected to an output node ($V_{OUT}$ node) 186. The voltage at the $V_{OUT}$ node 186 is $V_{OUT}$. The $V_{OUT}$ node 186 is connected to a drain of MP3 130, a second terminal of R1 134, a drain of MN16 180, a first terminal of the load capacitor 106, and a first terminal of the first current source 108. A second terminal of R2 136 is connected to ground 140. A source of MN16 180 is connected to a drain of MN17 182. A source of MN17 182 is connected to a drain of MN18 184. A source of MN18 184, a second terminal of the load capacitor 106, and a second terminal of the first current source 108 are connected to ground 140. A current $I_{COUT}$ flows from the $V_{OUT}$ node 186 to the first terminal of the load capacitor 106.

A ring amplifier, such as the ring amplifier 109, has certain similarities in function to an operational amplifier. The ring amplifier 109 receives inputs including: the reference voltage $V_{REF}$ (from the reference terminal 125), and also a feedback voltage $V_{IN}$ responsive to $V_{OUT}$. The ring amplifier 109 controls a gate voltage of the passFET 130 using a negative feedback loop responsive to a difference between $V_{REF}$ and $V_{IN}$. $V_{OUT}$ is regulated by the level of a current ($I_{PASSHET}$) through the passFET 130. Accordingly, $V_{OUT}$ is determined responsive to $V_{REF}$, as further described below. In some examples, $V_{REF}$ is determined using a bandgap voltage reference and/or a configurable voltage adjustment circuit, such as a variable resistor or other variable resistance.

In some examples, bandwidth and gain of the ring amplifier 109 change dynamically depending on a settling phase of the ring amplifier 109. The settling phases of the ring amplifier 109 include a starting phase (or slewing phase), a ringing phase, and a steady state phase. In a starting phase, such as while the LDO voltage regulator 102 is starting up following a power on reset (POR), the ring amplifier 109 has relatively high bandwidth, high slew rate, and low direct current (DC) gain, and the feedback loop responsive to $V_{REF}$ and $V_{OUT}$ operates as a relatively fast loop. Accordingly, the starting phase enables fast settling of $V_{OUT}$. In some examples, the starting phase corresponds to $V_{OUT}$ significantly higher or lower than (accordingly, far from) the target voltage. Herein, slew rate of the LDO voltage regulator 102 refers to a rate at which the LDO voltage regulator 102 controls $V_{OUT}$ to change ($\Delta V_{OUT}/\Delta t$). In an example, a starting voltage is zero volts, a target $V_{OUT}$ is 1.4 volts, and $V_{OUT}$ settles within a ten percent error margin of the target $V_{OUT}$ during the starting phase.

In a steady state phase, while the LDO voltage regulator 102 is operating so that $V_{OUT}$ is near the target voltage, the ring amplifier 109 has relatively low bandwidth, low slew rate, and high DC gain, and the feedback loop responsive to $V_{REF}$ and $V_{OUT}$ operates as a relatively slow loop. Accordingly, the steady state phase enables improved accuracy and load regulation by the LDO voltage regulator 102.

Use of a ring amplifier 109 in the LDO voltage regulator 102 may provide some or all of the following benefits. In some examples, because the ring amplifier 109 is able to separately provide high bandwidth and high gain in different operational phases, the ring amplifier 109 reduces current and device area requirements for the LDO voltage regulator 102 relative to an operational amplifier. Also, because the ring amplifier 109 enables high slew rate for large VOLT corrections, and accurate, low noise operation during operation within the target $V_{OUT}$ range, an external capacitor can be reduced in size or avoided.

MN1 118, MN2 120, MN8 150, and MN17 182 form a current mirror, so that they have proportional current response curves for respective gate-source voltages (Vas). MN1 118 is a diode-connected MOSFET that receives at its gate and drain the current IBIAS (from the second current source 116). Accordingly, a voltage at the gates of MN1 118, MN2 120, MN8 150, and MN17 182 is $V_{BIAS}$. The source voltages of MN1 118, MN2 120, and MN17 182 are respectively responsive to drain voltages of MN3 122, MN4 124, and MN18 184. MN3 122, MN4 124, and MN18 184 each have Vos equal to $V_{REF}$.

The first stage 110 of the ring amplifier 109 is a differential amplifier with output responsive to $V_{REF}$ and $V_{IN}$. $V_{IN}$ is responsive to $V_{OUT}$ as follows. R1 134 and R2 136 together form a resistor divider. A node A 188 is connected to a terminal of R1 134, a terminal of R2 136, and the gates of MN16 180 and MN6 146 (as described, MN6 146 is in the first stage 110). The voltage at node A 188 is $V_{IN}$. Accordingly, $V_{IN}=V_{OUT}\times R2/(R1+R2)$, so that target $V_{OUT}=V_{REF}\times(1+R1/R2)$.

The first stage 110 outputs to the positive terminal of the second volage source 158, the negative terminal of the third voltage source 160, and the drain of MN13 172. If the ENABLE signal is provided with a disable value, such as a voltage corresponding to a logic zero, then MN13 172 turns on, coupling the output of the first stage 110 to ground 140 and discharging the third capacitor 156. If the ENABLE signal is provided with an enable value, such as a voltage corresponding to a logic one, then MN13 172 turns off, allowing normal output of the first stage 110 to the second stage 112.

Figure 2:
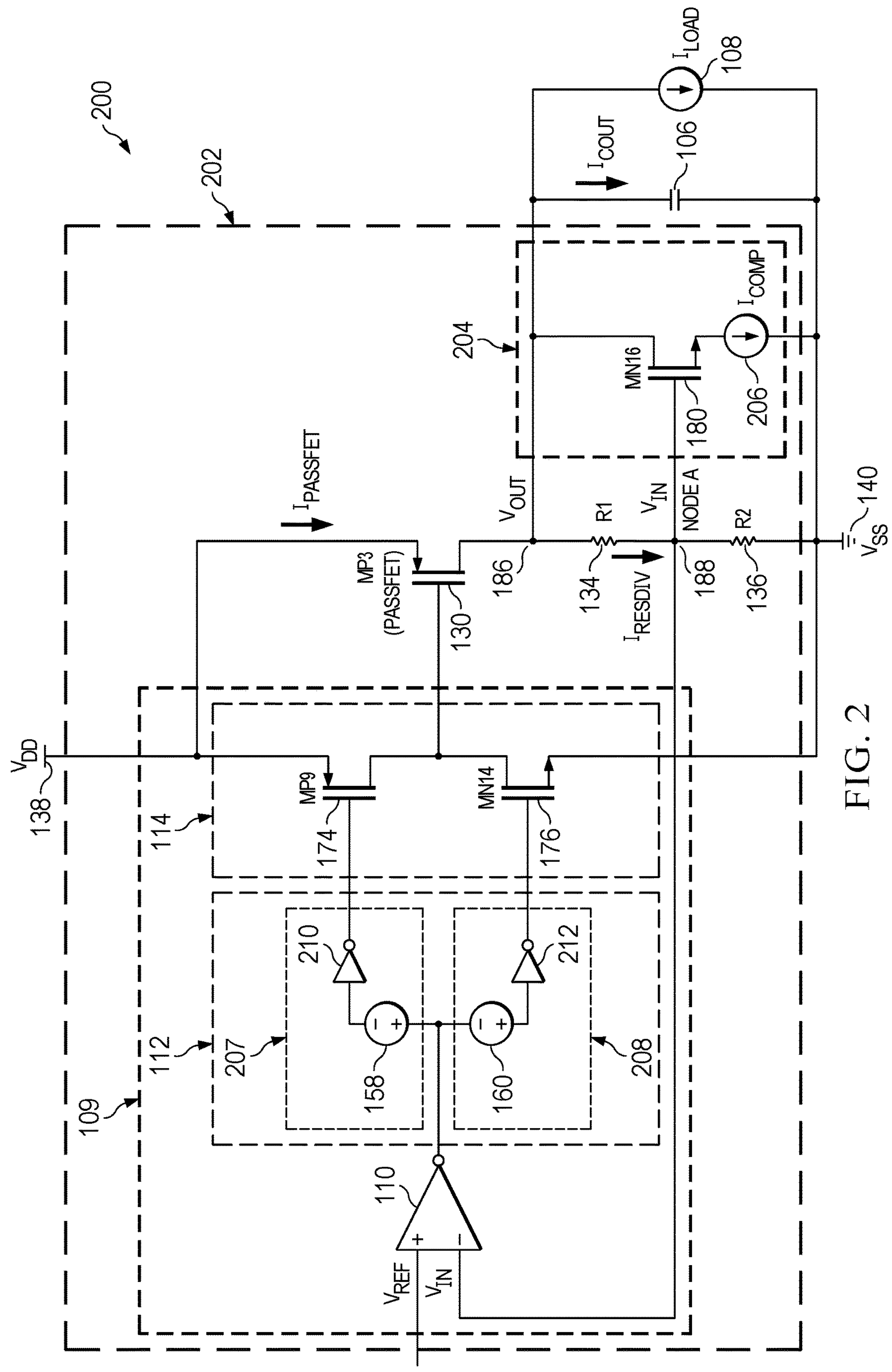
FIG. 2 is a first functional block diagram and circuit diagram of the example voltage regulated system of FIG. 1.

In the second stage 112, MP6 162, MN11 164, and the second voltage source 158 together form a first skewed inverter 207 (see FIG. 2). MP8 168, MN12 170, and the third voltage source 160 together form a second skewed inverter 208. An upper voltage boundary of a target $V_{OUT}$ range of the LDO voltage regulator 102 is responsive to the first skewed inverter 207, and a lower voltage boundary of the target $V_{OUT}$ range of the LDO voltage regulator 102 is responsive to the second skewed inverter 208. In some examples, while the LDO voltage regulator 102 is operating within the target $V_{OUT}$ range, the ring amplifier 109 does not alter a gate voltage of the passFET 130. Accordingly, the target $V_{OUT}$ range is also referred to as a deadzone around the target $V_{OUT}$.

In the second stage 112, the first skewed inverter 207 (via the drains of MP6 162 and MN11 164) outputs to the gate of MP9 174, and the second skewed inverter 208 (via the drains of MP8 168 and MN12 170) outputs to the gate of MN14 176. If the ENABLE signal is provided with a disable value, then MP7 166 and MN15 178 turn on. Turning on MP7 166 couples the gate of MP9 174 to the first voltage source 138, which turns off MP9 174, and turning on MN15 178 couples the gate of MN14 176 to ground 140, turning off MN14 176. If the ENABLE signal is provided with an enable value, then MP7 166 and MN15 178 turn off, allowing normal output of the second stage 112 to the third stage 114.

Output from the second stage 112 controls the third stage 114 to charge or discharge the second capacitor 129 by controlling MP9 174 or MN14 176, respectively, to turn on by varying amounts. If the second stage 112 decreases a gate voltage of MP9 174 to turn on MP9 174 more, MP9 174 more strongly couples the second capacitor 129 to the first voltage source 138, which increases charging of the second capacitor 129. Charging the second capacitor 129 increases the gate voltage of the passFET 130, which decreases the Vos of the passFET 130 to decrease the current $I_{PASSFET}$ flowing through the passFET 130 to the $V_{OUT}$ node 186. Decreasing $I_{PASSFET}$ reduces $V_{OUT}$.

If the second stage 112 increases a gate voltage of MN14 176 to turn on MN14 176 more, MN14 176 more strongly couples the second capacitor 129 to ground 140, which increases discharging of the second capacitor 129. Discharging the second capacitor 129 decreases the gate voltage of the passFET 130, which increases the Vos of the passFET 130 to increase the current $I_{PASSFET}$ flowing through the passFET 130 to the $V_{OUT}$ node 186. Increasing $I_{PASSFET}$ increases $V_{OUT}$. Operation of the feedback circuit 104 (and a similar feedback circuit 204) is further described with respect to FIG. 2. The functionality of the third stage 114, as described above, is summarized in Table 1:

TABLE 1

| Signal | Change if $V_{OUT} > V_{REF}$ | Change if $V_{OUT} < V_{REF}$ |
|---|---|---|
| $V_{GS}$ of MP9 174 | Decreases | Increases |
| $V_{GS}$ of MN14 176 | Increases | Decreases |
| Second capacitor 129 voltage | Charges | Discharges |
| $V_{GS}$ of the p-channel passFET 130 | Increases | Decreases |
| $I_{PASSFET}$ | Reduces | Increases |
| $V_{OUT}$ | Reduces | Increases |

FIG. 2 is a circuit diagram of a second example voltage regulated system 200 including an LDO voltage regulator 202 with a load transient response feedback circuit 204. In the voltage regulated system 200, the first stage 110 of the ring amplifier 109 is (or is represented as) an inverter with two inputs and one output, corresponding to an error amplifier with an inverted output. A noninverting input of the first stage 110 receives $V_{REF}$, and an inverting input of the first stage 110 is connected to node A 188 and receives $V_{IN}$.

The feedback circuit 204 includes a third current source 206 providing a current $I_{COMP}$ (a $V_{OUT}$ deviation compensating current). In some examples, the third current source 206 corresponds to the FIG. 1 MN17 182 (or MN17 182 together with MN18 184). Accordingly, the feedback circuit 204 is similar in certain respects to the feedback circuit 104 of FIG. 1. A level of $I_{COMP}$ is responsive to a drain voltage of MN17 182 (see FIG. 1). The drain voltage of MN17 182 is responsive to the gate voltage $V_{IN}$ of MN16 180.

In the second stage 112 of the ring amplifier 109, MP6 162 and MN11 164 are represented as (or may be replaced by) a first inverter 210. MP8 168 and MN12 170 are represented as (or may be replaced by) a second inverter 212. As described above, the first inverter 210 and the second voltage source 158 together form the first skewed inverter 207, and the second inverter 212 and the third voltage source 160 together form the second skewed inverter 208. An output of the first inverter 210 is connected to the gate of MP9 174, and an output of the second inverter 212 is connected to MN14 176.

As described above, while operating in the steady state, the slew rate of the ring amplifier 109 is reduced. It can take the ring amplifier 109 an operationally significant amount of time to return to high slew rate operation. Accordingly, when the voltage regulated system 200 experiences a change in $I_{LOAD}$ sufficient to cause $V_{OUT}$ to depart from the target $V_{OUT}$ range (an overshoot or an undershoot), it can take the LDO voltage regulator 202 an operationally significant amount of time to return $V_{OUT}$ to the target voltage range.

Overshoot refers to an increase in $V_{OUT}$ above a target voltage range. Similarly, undershoot refers to a decrease of $V_{OUT}$ below the target voltage range. Relatively slow feedback loop of the LDO voltage regulator 202 allows $V_{OUT}$ to depart further from the target range before the LDO voltage regulator 202 is able to start to pull $V_{OUT}$ back to the target. Accordingly, increased delay of the ring amplifier 109 allows increased overshoot or undershoot. In some examples, an amplitude of overshoot or undershoot caused by a load transient is responsive to an amplitude of the load transient and to a response delay of the ring amplifier 109.

Operation of the negative feedback loop of the ring amplifier 109 in response to undershoot is described first, then operation of the feedback circuit 204 in response to undershoot is described. Undershoot is used as a representative example; operation in response to overshoot is similar, except that signals with increasing levels in response to undershoot exhibit decreasing levels, and signals with decreasing levels in response to undershoot exhibit increasing levels.

$I_{PASSFET}$ provides a current into the $V_{OUT}$ node, and $I_{COMP}$, $I_{RESDIV}$, $I_{LOAD}$, and $I_{COUT}$ provide currents out of the $V_{OUT}$ node. This relationship is shown in Equation 1:

$$I_{PASSFET} = I_{COMP} + I_{RESDIV} + I_{LOAD} + I_{COUT} \quad \text{Equation 1}$$

Equation 1 can be rearranged to describe a balance of currents that equal $I_{COUT}$, as shown in Equation 2.

$$I_{COUT} = I_{PASSFET} - I_{COMP} - I_{RESDIV} - I_{LOAD} \quad \text{Equation 2}$$

$V_{OUT}$ can be described as the voltage at the first terminal of the load capacitor 106. The load capacitor 106 charges or discharges to increase or decrease $V_{OUT}$. The formula relating current and voltage change for the load capacitor 106 is shown in Equation 3.

$$\Delta V_{OUT} = I_{COUT} \times \Delta t / C_{OUT} \quad \text{Equation 3}$$

Accordingly, when load demand increases, corresponding to $I_{LOAD}$ increasing, the load capacitor discharges, corresponding to $I_{COUT}$ decreasing (or becoming negative). This behavior is described by Equation 4:

$$I_{COUT} = I_{PASSFET} - I_{COMP} - I_{RESDIV} - I_{LOAD} < 0 \quad \text{Equation 4}$$

Equation 3 shows that $I_{COUT}$ discharging causes $\Delta V_{OUT}$ to become negative, so that $V_{OUT}$ decreases. $C_{OUT}$ and $\Delta t$ can be described as positive constants for purposes of this analysis. In some examples, $V_{OUT}$ decreases rapidly in response to an increase in load demand.

$V_{OUT}$ dropping causes $V_{IN}$ to decrease, which causes the voltage output from the first stage 110 to decrease. The first stage 110 output voltage decreasing causes the outputs of the second stage 112, corresponding to the gate voltages of MP9 174 and MN14 176, to rise at different rates. These gate voltages rise to different levels because of the offset voltages provided by the second and third voltage sources 158 and 160. The different settled gate voltages cause a current through a drain-source path of MN14 176 to be greater than a current through a source-drain path of MP9 174, discharging the second capacitor 129 so that the gate voltage of the passFET 130 decreases. This causes Vos of the passFET 130 to become more negative, turning the passFET 130 on more so that the voltage across the passFET 130 decreases and $V_{OUT}$ increases.

Operation of the feedback circuit 204 in response to a deviation of $V_{OUT}$ from the target voltage is now described. The drop in $V_{OUT}$ described with respect to Equations 1 through 4 causes $V_{IN}$, which is the gate voltage of MN16 180, to decrease. This causes the drain voltage of MN17 182 to decrease, so the drain-source voltage of MN17 182 decreases. Accordingly, the current $I_{COMP}$ through the drain-source path of MN17 182 decreases. Equation 2 shows that $I_{COMP}$ decreasing causes $I_{COUT}$ to increase (become more positive), which charges the load capacitor 106, increasing $V_{OUT}$. This compensates for the increased load demand.

In some examples, this compensation occurs relatively quickly compared to response of the feedback loop of the ring amplifier 109 shortly after the change in load demand, which is also shortly after the ring amplifier 109 operated in the steady state phase. Recall that when in the steady state phase, the ring amplifier 109 has a relatively slow slew rate, and that in some examples, it can take the ring amplifier 109 an operationally significant amount of time to transition from the steady state phase to a phase enabling a higher slew rate. Accordingly, the feedback circuit 204 provides a fast feedback response to reduce an amplitude of an overshoot or an undershoot while a corresponding response propagates through the feedback loop of the ring amplifier 109. This reduces a time taken for the LDO voltage regulator 200 to return to stable, steady state operation. In some examples, use of the feedback circuit 204 enables benefits that may include one or more of reduced settling time or enabling use of the ring amplifier 109 (with corresponding benefits as described above).

In an example, load demand increases by 30 milliamps over the course of a duration between ten nanoseconds and one microsecond. In an example without the feedback circuit 204, this causes $V_{OUT}$ to drop from a target voltage of 1.4 volts to an undershoot level of 1.1 volts before $V_{OUT}$ begins to return toward the target voltage. In an example with the feedback circuit 204, the load demand increase causes $V_{OUT}$ to drop from the target voltage of 1.4 volts to an undershoot level of 1.2 volts before $V_{OUT}$ begins to return toward the target voltage.

In some examples, design of the feedback circuit 204 is responsive to an amount of DC bias current at the $V_{OUT}$ node 186 that fits within design constraints, and an amount of undershoot and/or overshoot that fits within design constraints.

Figure 3:
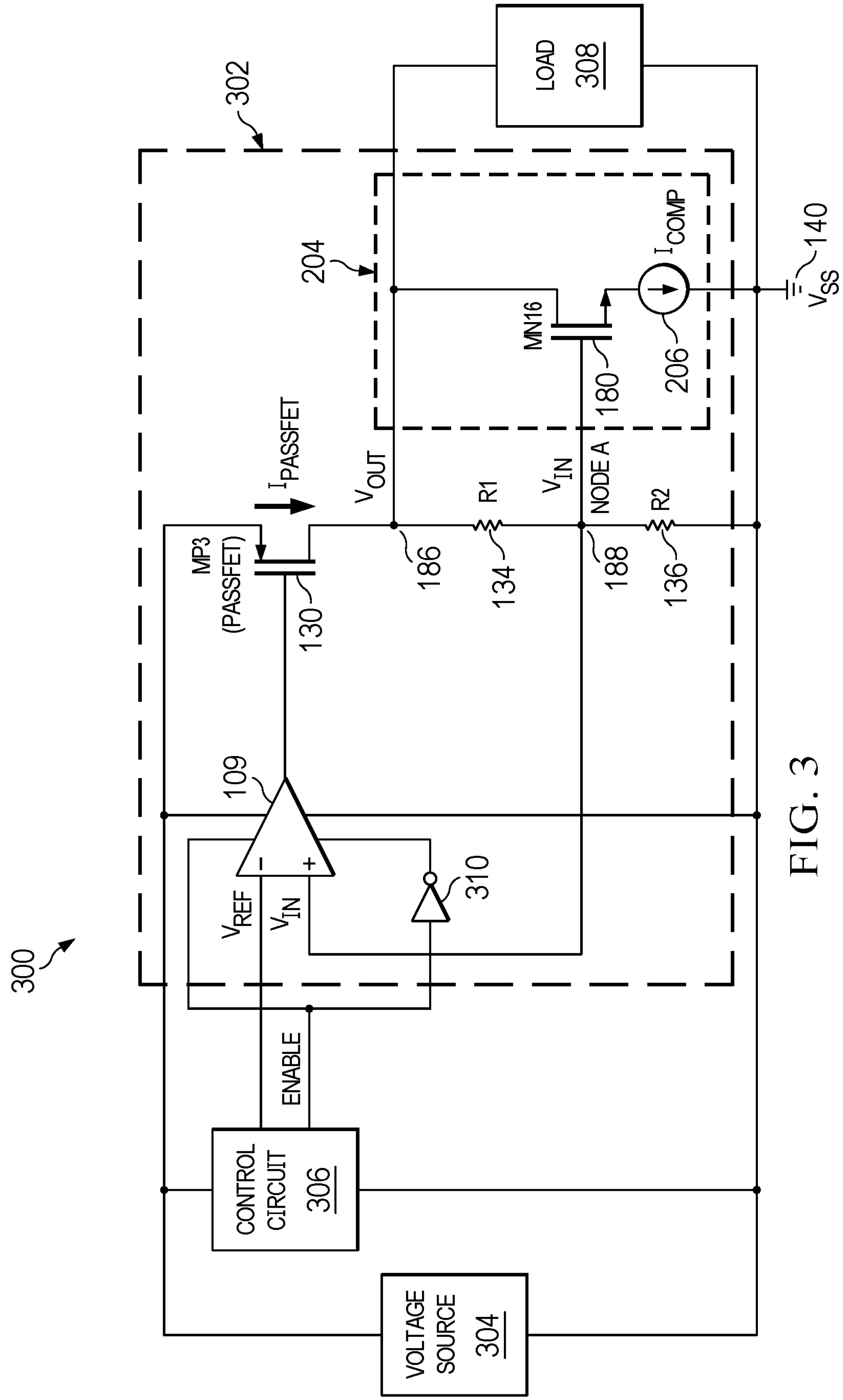
FIG. 3 is a second functional block diagram of the voltage regulated system of FIG. 1.

FIG. 3 is a circuit diagram of a third example voltage regulated system 300 including an LDO voltage regulator 302 with the load transient response feedback circuit 204. The third voltage regulated system 300 includes a voltage source 304, a control circuit 306, and a load 308. The LDO voltage regulator 302 includes the ring amplifier 109, an inverter 310, the passFET 130, R1 134, R2 136, and the feedback circuit 204.

A voltage source terminal of the voltage source 304 is connected to voltage source terminals of the control circuit 306 and the ring amplifier 109, and to the source of the passFET 130. A ground terminal of the voltage source 304 is connected to ground terminals of the control circuit 306, the ring amplifier 109, and the load 308, a terminal of R2 136, and a terminal of the third current source 206.

A first output of the control circuit 306 provides the ENABLE signal to an EN terminal of the ring amplifier 109 and to an input of the inverter 310. The EN terminal connects to the gates of MP7 166 and MP2 128. An output of the inverter 310 is connected to an/EN terminal of the ring amplifier 109. The/EN terminal connects to the gates of MN13 172 and MN15 178.

A second output of the control circuit 306 provides $V_{REF}$ to an inverted input of the ring amplifier 109. A non-inverting input of the ring amplifier 109 receives $V_{IN}$ from node A 188. An output of the ring amplifier 109 is connected to the gate of the passFET 130. An input terminal of the load 308 is connected to the $V_{OUT}$ node 186.

Modifications are possible in the described examples, and other examples are possible within the scope of the claims.

In some examples, an error amplifier other than a ring amplifier is used, such as an operational amplifier.

In some examples, an error amplifier such as the ring amplifier includes more, different, and/or fewer stages than those described herein.

In some examples, $V_{OUT}$ is connected to the error amplifier input without a resistor divider.

In some examples, different structure is used to set a deadzone than the skewed inverters described herein, such as current starved inverters or inverters coupled to transistors controlled using gate voltages responsive to designed deadzone boundary voltages.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an IC, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples may be included in an IC and other elements are external to the IC, in other example embodiments, additional or fewer features may be incorporated into the IC. In addition, some or all of the features illustrated as being external to the IC may be included in the IC and/or some features illustrated as being internal to the IC may be incorporated outside of the IC. As used herein, the term "integrated circuit" or "IC" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero. Modifications are possible in the described examples, and other examples are possible within the scope of the claims.

What is claimed is:

1. An integrated circuit (IC), comprising:

an error amplifier having a first input, a second input, and an output;

a first resistor and a second resistor, each having a first terminal and a second terminal;

a first transistor having a first terminal, a second terminal, and a control terminal, the control terminal of the first transistor coupled to the output of the error amplifier;

a second transistor having a first terminal, a second terminal, and a control terminal, the first terminal of the second transistor coupled to the first terminal of the first transistor and the first terminal of the first resistor, and the control terminal of the second transistor coupled to the second terminals of the first resistor and of the second resistor and to the first input of the error amplifier; and a current source having a first terminal and a second terminal, the first terminal of the current source coupled to the second terminal of the second transistor.

2. The IC of claim 1, wherein the current source includes:

a third transistor having a first terminal, a second terminal, and a control terminal, the first terminal of the third transistor coupled to the second terminal of the second transistor; and a fourth transistor having a first terminal, a second terminal, and a control terminal, the first terminal of the fourth transistor coupled to the second terminal of the third transistor, and the control terminal of the fourth transistor coupled to the second input of the error amplifier.

3. The IC of claim 1, wherein the current source includes a third transistor having a first terminal, a second terminal, and a control terminal, the first terminal of the third transistor coupled to the second terminal of the second transistor; and wherein the error amplifier includes a fourth transistor having a first terminal, a second terminal, and a control terminal;

further comprising a fifth transistor having a first terminal, a second terminal, and a control terminal, the first terminal of the fifth transistor coupled to the control terminals of the third transistor, the fourth transistor, and the fifth transistor.

4. The IC of claim 1, wherein the current source includes:

a third transistor having a first terminal, a second terminal, and a control terminal, the first terminal of the third transistor coupled to the second terminal of the second transistor; and a fourth transistor having a first terminal, a second terminal, and a control terminal, the first terminal of the fourth transistor coupled to the second terminal of the third transistor;

further comprising:

a fifth transistor having a first terminal, a second terminal, and a control terminal;

a sixth transistor having a first terminal, a second terminal, and a control terminal, the first terminal of the sixth transistor coupled to the control terminals of the third transistor and the fifth transistor;

a seventh transistor having a first terminal, a second terminal, and a control terminal, the first terminal of the seventh transistor coupled to the second terminal of the fifth transistor; and an eighth transistor having a first terminal, a second terminal, and a control terminal, the first terminal of the eighth transistor coupled to the second terminal of the sixth transistor, and the control terminal of the eighth transistor coupled to the control terminals of the fourth transistor and the seventh transistor.

5. The IC of claim 1, wherein the error amplifier is a ring amplifier.

6. The IC of claim 1, wherein the error amplifier, the first and second resistors, the first and second transistors, and the current source together form a low dropout voltage regulator that has a deadzone; and wherein the error amplifier includes:

a first stage that is a differential amplifier and that is configured to receive the first and second inputs of the error amplifier;

a second stage to which a range of the deadzone is responsive; and a third stage configured to provide a gate voltage to the control terminal of the first transistor.

7. The IC of claim 1, wherein the error amplifier includes:

a differential amplifier having a first input, a second input, and an output, the first and second inputs of the differential amplifier respectively coupled to the first and second input of the error amplifier;

a second stage having an input, a first output, and a second output, the input of the second stage coupled to the output of the differential amplifier; and a third stage having a first input, a second input, and an output, the first input of the third stage coupled to the first output of the second stage, the second input of the third stage coupled to the second output of the second stage, and the output of the third stage coupled to the control terminal of the first transistor.

8. The IC of claim 7, wherein the second stage includes a first inverter and a second inverter each with an input and an output, the inputs of the first and second inverters each coupled to the input of the second stage, and the outputs of the first and second inverters respectively coupled to the first and second outputs of the second stage.

9. The IC of claim 8, wherein the second stage includes a first voltage source and a second voltage source each having first and second terminals, the first terminal of the first voltage source coupled to the input of the first inverter, the second terminal of the first voltage source coupled to the output of the differential amplifier and to the first terminal of the second voltage source, and the second terminal of the second voltage source coupled to the input of the second inverter.

10. The IC of claim 7, wherein the third stage includes:

a third transistor having a first terminal, a second terminal, and a control terminal, the control terminal of the third transistor coupled to the first output of the second stage; and a fourth transistor having a first terminal, a second terminal, and a control terminal, the first terminal of the third transistor coupled to the first terminal of the fourth transistor and to the control terminal of the first transistor, and the control terminal of the fourth transistor coupled to the second output of the second stage.

11. The IC of claim 7, further comprising:

an inverter including an input and an output;

a third transistor having a first terminal, a second terminal, and a control terminal, the first terminal of the third transistor coupled to the output of the differential amplifier;

a fourth transistor having a first terminal, a second terminal, and a control terminal, the first terminal of the fourth transistor coupled to the second output of the second stage, and the control terminals of the third and fourth transistors coupled to the output of the inverter;

a fifth transistor having a first terminal, a second terminal, and a control terminal, the first terminal of the fifth transistor coupled to the first output of the second stage; and a sixth transistor having a first terminal, a second terminal, and a control terminal, the first terminal of the sixth transistor coupled to the control terminal of the first transistor, and the control terminals of the fifth and sixth transistors coupled to the input of the inverter.

12. A system comprising:

a control circuit including a reference voltage terminal;

an error amplifier having a first input, a second input, and an output, the first input of the error amplifier coupled to the reference voltage terminal of the control circuit;

a first resistor and a second resistor, each having a first terminal and a second terminal;

a first transistor having a first terminal, a second terminal, and a control terminal, the control terminal of the first transistor coupled to the output of the error amplifier;

a second transistor having a first terminal, a second terminal, and a control terminal, the first terminal of the second transistor coupled to the first terminal of the first transistor and the first terminal of the first resistor, and the control terminal of the second transistor coupled to the second terminals of the first resistor and of the second resistor and to the second input of the error amplifier; and a current source having a first terminal and a second terminal, the first terminal of the current source coupled to the second terminal of the second transistor.

13. The system of claim 12, wherein the current source includes:

a third transistor having a first terminal, a second terminal, and a control terminal, the first terminal of the third transistor coupled to the second terminal of the second transistor; and a fourth transistor having a first terminal, a second terminal, and a control terminal, the first terminal of the fourth transistor coupled to the second terminal of the third transistor, and the control terminal of the fourth transistor coupled to the second input of the error amplifier.

14. The system of claim 12, wherein the current source includes a third transistor having a first terminal, a second terminal, and a control terminal, the first terminal of the third transistor coupled to the second terminal of the second transistor; and wherein the error amplifier includes a fourth transistor having a first terminal, a second terminal, and a control terminal;

further comprising a fifth transistor having a first terminal, a second terminal, and a control terminal, the first terminal of the fifth transistor coupled to the control terminals of the third transistor, the fourth transistor, and the fifth transistor.

15. The system of claim 12, wherein the current source includes:

a third transistor having a first terminal, a second terminal, and a control terminal, the first terminal of the third transistor coupled to the second terminal of the second transistor; and a fourth transistor having a first terminal, a second terminal, and a control terminal, the first terminal of the fourth transistor coupled to the second terminal of the third transistor;

further comprising:

a fifth transistor having a first terminal, a second terminal, and a control terminal;

a sixth transistor having a first terminal, a second terminal, and a control terminal, the first terminal of the sixth transistor coupled to the control terminals of the third transistor and the fifth transistor;

a seventh transistor having a first terminal, a second terminal, and a control terminal, the first terminal of the seventh transistor coupled to the second terminal of the fifth transistor; and an eighth transistor having a first terminal, a second terminal, and a control terminal, the first terminal of the eighth transistor coupled to the second terminal of the sixth transistor, and the control terminal of the eighth transistor coupled to the control terminals of the fourth transistor and the seventh transistor.

16. The system of claim 12, wherein the error amplifier, the first and second resistors, the first and second transistors, and the current source together form a low dropout voltage regulator that has a deadzone; and wherein the error amplifier includes:

a first stage that is a differential amplifier and that is configured to receive the first and second inputs of the error amplifier;

a second stage to which a range of the deadzone is responsive; and a third stage configured to provide a gate voltage to the control terminal of the first transistor.

17. The system of claim 12, wherein the error amplifier includes:

a differential amplifier having a first input, a second input, and an output, the first and second inputs of the differential amplifier respectively coupled to the first and second input of the error amplifier;

a second stage having an input, a first output, and a second output, the input of the second stage coupled to the output of the differential amplifier; and a third stage having a first input, a second input, and an output, the first input of the third stage coupled to the first output of the second stage, the second input of the third stage coupled to the second output of the second stage, and the output of the third stage coupled to the control terminal of the first transistor.

18. The system of claim 17, wherein the second stage includes a first inverter and a second inverter each with an input and an output, the inputs of the first and second inverters each coupled to the input of the second stage, and the outputs of the first and second inverters respectively coupled to the first and second outputs of the second stage.

19. The system of claim 18, wherein the second stage includes a first voltage source and a second voltage source each having first and second terminals, the first terminal of the first voltage source coupled to the input of the first inverter, the second terminal of the first voltage source coupled to the output of the differential amplifier and to the first terminal of the second voltage source, and the second terminal of the second voltage source coupled to the input of the second inverter.

20. The system of claim 17, wherein the control circuit includes an enable output and the error amplifier includes an enable input, the enable output of the control circuit coupled to the enable input of the error amplifier.

* * * * *